(12) United States Patent
Fell et al.

(10) Patent No.: US 7,378,472 B2
(45) Date of Patent: May 27, 2008

(54) INJECTION MOULDING POLYMER

(75) Inventors: Hans Jörg Fell, Stathello (NO); Philipp Walter, Irvington, NY (US)

(73) Assignee: Borealis Technology Oy, Porvoo (FI)

( * ) Notice: Subject to any disclaimer, the term of this patent is extended or adjusted under 35 U.S.C. 154(b) by 0 days.

(21) Appl. No.: 10/561,482

(22) PCT Filed: Jul. 16, 2004

(86) PCT No.: PCT/EP2004/007897

§ 371 (c)(1),
(2), (4) Date: Dec. 21, 2005

(87) PCT Pub. No.: WO2005/014680

PCT Pub. Date: Feb. 17, 2005

(65) Prior Publication Data
US 2006/0155080 A1    Jul. 13, 2006

(30) Foreign Application Priority Data
Jul. 21, 2003   (GB) .................... 0317012.3

(51) Int. Cl.
*C08F 4/6192* (2006.01)
*C08F 210/16* (2006.01)

(52) U.S. Cl. .............. 526/64; 526/65; 526/348; 526/943; 525/52; 525/53; 525/240

(58) Field of Classification Search ............ 525/52, 525/53, 240; 526/64, 65, 348, 943
See application file for complete search history.

(56) References Cited

U.S. PATENT DOCUMENTS

| | | | |
|---|---|---|---|
| 4,508,842 A | 4/1985 | Beran et al. | 502/112 |
| 5,434,010 A | 7/1995 | Smith et al. | 428/520 |
| 5,718,974 A | 2/1998 | Kmiec | 728/383 |
| 5,814,413 A | 9/1998 | Beerwart | 428/516 |
| 6,103,807 A | 8/2000 | Carter et al. | 524/481 |
| 2005/0170112 A1* | 8/2005 | Lequeux et al. | 428/35.7 |

FOREIGN PATENT DOCUMENTS

| | | |
|---|---|---|
| EP | 0 120 503 | 10/1984 |
| EP | 0 916 693 | 5/1999 |
| EP | 1 146 079 | 10/2001 |
| EP | 1 333 044 | 8/2003 |
| EP | 1 359 191 | 11/2003 |
| WO | WO 92/12182 | 7/1992 |
| WO | WO 97/03124 | 7/1996 |
| WO | WO 01/96419 | 12/2001 |

* cited by examiner

*Primary Examiner*—Roberto Rábago
(74) *Attorney, Agent, or Firm*—Needle & Rosenberg, P.C.

(57) ABSTRACT

The use of a multimodal polyethylene composition comprising as comonomers to ethylene at least two $C_{4-12}$ alpha olefins in injection molding.

11 Claims, No Drawings

INJECTION MOULDING POLYMER

CROSS REFERENCE TO RELATED APPLICATIONS

The present application claims priority to Great Britain Patent Application No. 0317012.3, filed Jul. 21, 2003, which application is incorporated herein fully by this reference.

This invention relates to a new polymer for injection moulding, in particular to a bimodal terpolymer composition which gives rise to a polymer having ideal properties for injection moulding, especially for moulding articles which will be used in contact with food.

Linear low density polyethylenes (LLDPE's) are widely used in the manufacture of packaging products which are typically produced by injection moulding. Conventional LLDPE's are made using Ziegler-Natta catalysis and therefore have broad molecular weight distributions.

In many applications, e.g. where food products are being packaged, it is essential that the injection moulded article, e.g. container or closure means therefor, does not contaminate the product. For these applications, an indication of the degree of contamination may be obtained from tests which determine the level of migration of the polymer material, e.g. when immersed in olive oil or hexane. Ziegler-Natta produced LLDPE polymers have been found to exhibit high levels of migration, i.e. foods in contact with Ziegler-Natta LLDPE's may become contaminated with polymer, and are therefore unsuitable for use in applications such as food and medical product packaging, especially where contact with fatty foods is made.

LLDPE's made using single site catalysis, in particular those produced using metallocenes (mLLDPE's), have been found to give rise to injection moulded articles having acceptable levels of migration due to their much narrower molecular weight distributions and molecular weight independent short chain branching distribution (SCBD). As discussed in WO01/96419 such LLDPE's are particularly useful for packaging fatty foods. However, mLLDPE's exhibit low shear thinning and do not therefore exhibit ideal processability.

When the mLLPDE is exposed to shear, e.g. during the screw and melting procedure prior to injection into the mould, its lack of shear thinning causes high pressure build up in the injection moulding machine, increased motor load, etc. Thus, the polymer is generally hard to process. This problem has been solved by the inclusion of long chain branches into the mLLDPE and these can be introduced by, for example, blending with high pressure polyethylene, post reactor treatment or in situ formation.

However, blending and post reactor treatment of the polymer are cost intensive procedures and the in situ formation of long chain branches requires particular single site catalysts and polymerisation conditions. Thus long chain branching inclusion is not favoured.

It is also known that mechanical properties, e.g impact properties, can be generally improved by employing higher olefins. Thus whilst 1-butene is a commonly used comonomer, improved mechanical properties, e.g. impact properties, can be obtained relative to 1-butene using 1-hexene as comonomer.

The use of higher alpha-olefin comonomers, i.e. $C_4$ or greater alpha-olefins, however increases the cost of the polymer product and, generally, the efficiency of comonomer incorporation decreases as the carbon content of the comonomer increases, i.e. hexene is less efficiently incorporated than butene and octene is less efficiently incorporated than hexene, etc. For cost and efficiency reasons therefore, incorporation of higher alpha olefins is not always favoured.

There remains a need therefore to manufacture polymers for injection moulding which have low migration properties, excellent mechanical properties as well as high shear thinning and hence acceptable processing properties. The polymers must also be cheap to manufacture to satisfy the packaging market.

We have now surprisingly found that by incorporating two different alpha-olefin comonomers into a polyethylene polymer, a multimodal polyethylene terpolymer product may be produced which has ideal properties for injection moulding compared to polyethylenes produced using either of the comonomers as the sole comonomer. The polyethylene terpolymers of the invention possess a multimodal molecular weight distribution therefore giving rise to improved processability and mechanical properties whilst migration is kept to a minimum by the different densities of the terpolymer component and the resulting reduction in short chain branching in the shorter chain components.

Thus, viewed from one aspect the invention provides the use of a multimodal, e.g. bimodal, polyethylene composition comprising as comonomers to ethylene at least two $C_{4-12}$ alpha olefins, preferably at least two alpha olefins selected from but-1-ene, hex-1-ene, 4-methyl-pent-1-ene, hept-1-ene, oct-1-ene, and dec-1-ene, particularly but-1-ene and hex-1-ene in injection moulding.

Viewed from another aspect the invention provides an injection moulded article produced from a multimodal polyethylene composition comprising as comonomers to ethylene at least two $C_{4-12}$ alpha olefins, preferably at least two alpha olefins selected from but-1-ene, hex-1-ene, 4-methyl-pent-1-ene, hept-1-ene, oct-1-ene, and dec-1-ene, particularly but-1-ene and hex-1-ene.

Typically, the polyethylene composition is a mixture of two or more polyethylenes, e.g. produced by blending or by two-or-more stage polymerization reactions. The constituent polyethylenes may be homopolymers, copolymers, terpolymers or polymers of four or more comonomers; preferably however at least one polymer is a terpolymer or at least two polymers are copolymers, in particular in which one monomer, the major component, is ethylene and one or two comonomers, the minor components, are $C_4$ and/or $C_6$ alpha-olefins.

In an especially preferred embodiment, the polyethylene composition comprises an ethylene/1-butene copolymer fraction and an ethylene/1-butene/1-hexene terpolymer fraction.

It is especially preferred that the polymer be prepared in a two or more stage polymerization in which in an earlier stage the lower alpha-olefin comonomer (e.g. 1-butene) is incorporated and in which in a later stage the higher alpha-olefin comonomer is incorporated (e.g. 1-hexene). Nonetheless, it is within the scope of the invention to produce the polymer in a two stage polymerization reaction in which an ethylene homopolymer is produced in the first stage and an ethylene terpolymer is produced in the second stage or vice versa or in which an ethylene copolymer with the higher alpha-olefin comonomer is produced in the first stage and an ethylene copolymer with the lower alpha-olefin comonomer is produced in the second stage. Likewise, an ethylene copolymer may be produced in the first stage and an ethylene terpolymer in the second stage and vice versa. Terpolymers may also be produced in both stages although preferably a lower molecular weight higher density terpolymer is formed in a first stage with a higher molecular weight lower density terpolymer being formed in a second stage.

The expression "homopolymer" of ethylene used herein refers to a polyethylene that consists substantially, i.e. at least 98% by weight, preferably at least 99% by weight, more preferably at least 99.5% by weight, most preferably at least 99.8% by weight, of ethylene.

The ethylene polymers of the injection moulded articles of the invention can be produced using a Ziegler-Natta catalyst or a single site catalyst.

Preferably however, the polyethylene polymers of use in the invention are produced using a so-called single site catalyst, e.g. a catalyst comprising a metal coordinated by one or more η-bonding ligands. Such η-bonded metals are normally referred to as metallocenes and the metals are typically Zr, Hf or Ti, especially Zr or Hf. The η-bonding ligand is typically an $\eta^5$-cyclic ligand, i.e. a homo or heterocyclic cyclopentadienyl group optionally with fused or pendant substituents. Such metallocene catalysts have been widely described in the scientific and patent literature for about twenty years. Such metallocene catalysts are frequently used with catalyst activators or co-catalysts, e.g. alumoxanes such as methylaluminoxane, again as widely described in the literature.

Preferred metallocenes are optionally bridged bisindenyl or biscyclopentadienyl compounds with Hf, Zr or Ti. The η-ligands can carry typical substituents, preferably up to 5, e.g. 1 or 2, $C_{1-6}$-alkyl substituents as is known in the art. The metal ions conventionally are coordinated to sigma ligands, e.g. two chloride ligands. Bridges are typically ethylene or silyl based, e.g. dimethylsilyl.

The polymer used in the articles of the invention is multimodal, preferably bimodal, i.e. its molecular weight profile does not comprise a single peak but instead comprises the combination of two or more peaks (which may or may not be distinguishable) centred about different average molecular weights as a result of the fact that the polymer comprises two or more separately produced components. In this embodiment, a higher molecular weight component preferably corresponds to a copolymer (or terpolymer etc.) of the higher alpha-olefin comonomer and a lower molecular weight component preferably corresponds to an ethylene homopolymer or a copolymer (or terpolymer etc.) of the lower alpha-olefin comonomer. Such bimodal ethylene polymers may be prepared for example by two or more stage polymerization or by the use of two or more different polymerization catalysts in a one stage polymerization. Preferably however they are produced in a two-stage polymerization using the same catalyst, e.g. a metallocene catalyst, in particular a slurry polymerization in a loop reactor followed by a gas phase polymerization in a gas phase reactor. A loop reactor—gas phase reactor system is marketed by Borealis A/S, Denmark as a BORSTAR reactor system.

Preferably, the lower molecular weight polymer fraction is produced in a continuously operating loop reactor where ethylene is polymerized in the presence of a polymerization catalyst as stated above and a chain transfer agent such as hydrogen. The diluent is typically an inert aliphatic hydrocarbon, preferably isobutane or propane. A $C_4$ to $C_{12}$-olefin comonomer is preferably added to control the density of the lower molecular weight copolymer fraction.

Preferably, the hydrogen concentration is selected so that the lower molecular weight copolymer fraction has the desired melt flow rate.

In the case where the target density of the lower molecular weight copolymer fraction exceeds 955 kg/m³, it is advantageous to operate the loop reactor using propane diluent in so called supercritical conditions where the operating temperature exceeds the critical temperature of the reaction mixture and the operating pressure exceeds the critical pressure of the reaction mixture. A preferred range of temperature is then from 90 to 110° C. and the range of pressures is from 50 to 80 bar.

The slurry is intermittently or continuously removed from the loop reactor and transferred to a separation unit where at least the chain transfer agents (e.g. hydrogen) are separated from the polymer. The polymer containing the active catalyst is then introduced into a gas phase reactor where the polymerization proceeds in the presence of additional ethylene, comonomer(s) and optionally chain transfer agent to produce the higher molecular weight copolymer fraction. The polymer is intermittently or continuously withdrawn from the gas phase reactor and the remaining hydrocarbons are separated from the polymer.

The conditions in the gas phase reactor are selected so that the ethylene polymer has the desired properties. Preferably, the temperature in the reactor is between 70 and 100° C. and the pressure is between 10 to 40 bar. The hydrogen to ethylene molar ratio ranges from preferably 0 to 1 mol/kmol, more preferably 0 to 0.5 mol/kmol and the alpha-olefin comonomer to ethylene molar ratio ranges from preferably 1 to 100 mol/kmol, more preferably 5 to 50 mol/kmol and most preferably 5 to 30 mol/kmol.

The injected moulded article of the invention may be prepared using conventional injection moulding apparatus, e.g. a repetitive process in which plastic is melted and injected into a mould cavity where the article is cooled down. After cooling, the mould opens and the article is ejected.

The melt can be prepared conventionally in a screw set up which acts to melt and homogenise the polymer while slowly retracting to build up the melt reservoir necessary for the injection step. The screw can then be used as a plunger in a forward movement to inject the melt through the runner, optionally a manifold and the gate into the mould.

Whilst the polyethylene composition may be used to make any injection moulded article it is preferred if the articles are for use in medical or food packaging in particular closure means such as lids or plastic storage containers or eating/drinking containers e.g. cups, bowls, dishes etc.

Viewed from a further aspect the invention provides a product (e.g. foodstuff, medical product etc) packaged within an injection moulded article as hereinbefore described. The articles of the invention are particularly suited to packaging fatty foods.

The article of the invention is preferably formed from either (I) a bimodal polyethylene composition comprising
  a) a lower molecular weight homopolymer of ethylene and
  b) a higher molecular weight terpolymer of ethylene, 1-butene and a $C_5$ to $C_{12}$ alpha-olefin (e.g. $C_6$ to $C_{12}$ alpha-olefin); or
(II) a bimodal polyethylene composition comprising
  a) a lower molecular weight polymer which is a binary copolymer of ethylene and 1-butene or 1-hexene and
  b) a higher molecular weight polymer different from a) which is either a binary copolymer of ethylene and 1-hexene, or a terpolymer of ethylene, 1-butene and a $C_5$ to $C_{12}$ alpha-olefin (e.g. $C_6$ to $C_{12}$ alpha-olefin); or
(III) a bimodal polyethylene composition comprising
  a) a lower molecular weight polymer which is a terpolymer of ethylene, 1-butene and 1-hexene, and b) a higher molecular weight polymer which is a terpolymer of ethylene, 1-butene and 1-hexene.

The polymers used in the manufacture of these articles may themselves be new and hence form a still yet further aspect of the invention.

In a preferred embodiment the present invention provides an article of a bimodal polymer with a relatively narrow molecular weight distribution (MWD), good processability, and a low level of extractibles. The MWD is preferably 2 to 25, e.g 2 to 10, more preferably 2.0 to 8.0, e.g. 2.0 to 6.0 or 3.0 to 8.0, especially 2.5 to 4.5.

The weight average molecular weight of the multimodal e.g. bimodal polymer is preferably between 15,000 and 250,000 g/mol, e.g. 20,000 to 180,000, preferably 30,000 to 140,000.

The molecular weight distribution of the polymer is further characterized by the way of its melt flow rate (MFR) according to ISO 1133 at 190° C. The final multimodal e.g. bimodal polymer preferably has a melt flow rate $MFR_2$ of 0.4 to 100 g/10 min, more preferably of 0.8 to 80 g/10 min, especially 1.5-40 g/10 min. The lower molecular weight polymer fraction preferably has a melt index $MFR_2$ of 1 to 400 g/10 min, more preferably of 10 to 200 g/10 min, especially 50 to 150 g/10 min.

The melt flow rate and the density of the material are decisive for strength properties.

The density of the final multimodal e.g. bimodal polymer is preferably 870 to 940 kg/m$^3$, more preferably of 890 to 935 kg/m$^3$, especially 905 to 930 kg/m$^3$. The density of the lower molecular weight polymer fraction is preferably 905 to 975 kg/m$^3$, more preferably 915 to 950 kg/m$^3$, especially 920 to 945 kg/m$^3$, e.g. 930 kg/m$^3$ or greater. The density of the lower molecular weight fraction of the polyethylene composition should preferably be greater than that of the higher molecular weight composition.

The multimodal e.g. bimodal polymer according to the present invention preferably comprises 10 to 70%, more preferably 20 to 65% and most preferably 40 to 60% by weight of the lower molecular weight copolymer fraction with regard to the total composition.

The overall comonomer content in the polymer is preferably 0.1 to 10 mol %, preferably 0.5 to 7 mol % and in the lower molecular weight polymer the comonomer content is preferably 0 to 3.0 mol %, preferably 0 to 2.5 mol %. In the higher molecular weight polymer the comonomer content is preferably 0.1 to 10 mol %, preferably 0.1 to 7 mol %. Comonomer contents may be measured by NMR.

Further, the molecular weight of the higher molecular weight copolymer fraction should be such that when the lower molecular weight copolymer fraction has the melt index and density specified above, the final multimodal polymer has the melt index and density as discussed above.

The final multimodal e.g. bimodal polymer preferably has a tensile modulus (ISO527-2) of 10 to 500 MPa, preferably 30 to 450 MPa, especially 60 to 400 MPa.

The final multimodal e.g. bimodal polymer preferably has an Impact strength (ISO179 23° C.) of at least 30 kJ/m$^2$, preferably at least 40 kJ/m$^2$, especially at least 50 kJ/m$^2$.

The final multimodal e.g. bimodal polymer preferably has a hexane extractable fraction of less than 5, preferably less than 3, more preferably less than 2.5, especially less than 2 wt %.

The final multimodal polymer preferably has a low level of migration measured by immersion in olive oil (as in Example 6) of less than 10, preferably less than 5, especially less than 3 mg/dm$^2$.

It has surprisingly been found that for the same density the polymers of the invention exhibit high tensile modulus and high impact strength compared to conventional copolymers. In general, stiffness (tensile strength) and impact are intrinsically linked to crystallinity and thereby the density. So increasing density increases stiffness and decreases impact. However, in the polymers of the invention high stiffness and high impact strength are observed even at relatively high densities. This stiffness/impact balance allows the production of injected moulded articles with reduced wall thicknesses, i.e. lighter and cheaper injected moulded articles and also allows cycle times to be decreased, i.e. increase the number of injections per minute. Hence the polymers of the invention allow the production of more articles at less cost than is conventionally achieved.

In addition to the polymer itself, the composition and injection moulded article of the invention may also contain antioxidants, process stabilizers, pigments and other additives known in the art.

The present invention will now be illustrated further by the following non-limiting Examples:

EXPERIMENTAL

MFR

MFR was measured according to ISO 1133 at 190° C. The load has been indicated as a subscript, i.e. $MFR_2$ denotes the measurement has been carried out under a load of 2.16 kg and $MFR_{21}$ denotes the measurement has been carried out under a load of 21.6 kg, respectively.

$M_w$, $M_n$ and MWD:

The weight-average molecular weight $M_w$, and the molecular weight distribution (MWD=$M_w/M_n$, where $M_n$ equals number-average molecular weight) is measured by a method based on ISO/TC61/SC5 N 5024. The difference between this method and the method used is the temperature; the ISO method being at room temperature while the method used being at 140° C. The ratio of $M_w$ and $M_n$ is a measure of the broadness of the distribution, since each is influenced by the opposite end of the "population".

Density:

Density is measured according to ISO 1183/D.

1-butene and 1-hexene contents:

1-butene and 1-hexene contents of the polymers were determined by $^{13}$C NMR.

Extractables in Hexane:

Hexane extractions are carried out using ASTM D5227.

Rheology:

The Theological properties of the polymers were determined using Rheometrics RDA II Dynamic Rheometer. The measurements were carried out at 190° C. under a nitrogen atmosphere. The measurement give storage modulus (G') and loss modulus (G") together with absolute value of complex viscosity (*) as a function of frequency or absolute value of complex modulus (G*), where:

$$*=((G'^2+G''^2)/)^{1/2}$$

$$G^*=(G'^2+G''^2)^{1/2}$$

In the present method, viscosity at low shear rates (0.05 rad/s) is plotted against viscosity at high shear rates (300 rad/s) as a measure of processability; a high viscosity at low shear rates combined with a low viscosity at high shear rates giving superior processability.

Catalyst Preparation

Example 1

134 grams of a metallocene complex (bis(n-butylcyclopentadienyl) hafnium dichloride supplied by Witco as TA02823, containing 0.36% by weight Hf) and 9.67 kg of a 30% solution of methylalumoxane (MAO) in toluene (supplied by Albemarle) were combined and 3.18 kg dry, purified toluene was added. The thus obtained complex solution was added on 17 kg silica carrier Sylopol 55 SJ by Grace. The complex was fed very slowly with uniform spraying during 2 hours. Temperature was kept below 30° C. The mixture was allowed to react for 3 hours after complex addition at 30° C. The thus obtained solid catalyst was dried by purging it with nitrogen at 50° C. for three hours and recovered.

Polymeristion

Example 2

A continuously operating loop reactor having a volume of 500 dm$^3$ was operated at 85° C. temperature and 60 bar pressure. Into the reactor were introduced propane diluent, ethylene, 1-butene comonomer, hydrogen and the polymerisation catalyst prepared according to Catalyst Preparation Example 1 in such amounts that the ethylene concentration in the liquid phase of the loop reactor was 7.2% by mole, the ratio of hydrogen to ethylene was 0.63 mol/kmol, the ratio of 1-butene to ethylene was 155 mol/kmol and the polymer production rate in the reactor was 30 kg/h. The thus formed polymer had a melt index MFR$_2$ of 120 g/10 min and a density of 936 kg/m$^3$.

The slurry was intermittently withdrawn from the reactor by using a settling leg and directed to a flash tank operated at a temperature of about 50° C. and a pressure of about 3 bar.

From the flash tank the powder, containing a small amount of residual hydrocarbons, was transferred into a gas phase reactor operated at 75° C. temperature and 20 bar pressure. Into the gas phase reactor were also introduced additional ethylene, 1-hexene comonomer and nitrogen as inert gas in such amounts that the ethylene concentration in the circulating gas was 19% by mol, the ratio of hydrogen to ethylene was about 1.0 mol/kmol, the ratio of 1-hexene to ethylene was 12 mol/kmol and the polymer production rate was 30 kg/h. The concentration of 1-butene was so low that it could not be detected by the on-line gas chromatograph which was used to monitor the gas composition.

The polymer collected from the gas phase reactor was stabilised by adding to the powder 400 ppm Irganox B561. The stabilised polymer was then extruded and pelletised under nitrogen atmosphere with a CIM90P extruder, manufactured by Japan Steel Works. The melt temperature was 200° C., throughput 280 kg/h and the specific energy input (SEI) was 200 kWh/t.

The production split between the loop and gas phase reactors was thus 50/50. The polymer pellets had a melt index MFR$_2$ of 20 g/10 min, a weight average molecular weight M$_w$ of 59600 g/mol, a number average molecular weight M$_n$ of 16900 g/mol and a z-average molecular weight M$_z$ of 134000 g/mol. Further, the polymer had a zero shear rate viscosity $\eta_0$ of 460 Pa·s, and a shear thinning index SHI$_{0/100}$ of 2.7.

Example 3

Comparative

A continuously operating loop reactor having a volume of 500 dm$^3$ was operated at 85° C. temperature and 60 bar pressure. Into the reactor were introduced propane diluent, ethylene, 1-butene comonomer, hydrogen and the polymerisation catalyst prepared according to Catalyst Preparation Example 1 in such amounts that the ethylene concentration in the liquid phase of the loop reactor was 6.6% by mole, the ratio of hydrogen to ethylene was 0.63 mol/kmol, the ratio of 1-butene to ethylene was 183 mol/kmol and the polymer production rate in the reactor was 25 kg/h. The thus formed polymer had a melt index MFR$_2$ of 120 g/10 min and a density of 936 kg/m$^3$.

The slurry was intermittently withdrawn from the reactor by using a settling leg and directed to a flash tank operated at a temperature of about 50° C. and a pressure of about 3 bar.

From the flash tank the powder, containing a small amount of residual hydrocarbons, was transferred into a gas phase reactor operated at 75° C. temperature and 20 bar pressure. Into the gas phase reactor were also introduced additional ethylene, 1-butene comonomer and nitrogen as inert gas in such amounts that the ethylene concentration in the circulating gas was 23% by mole, the ratio of hydrogen to ethylene was about 1.2 mol/kmol, the ratio of 1-butene to ethylene was 48 mol/kmol and the polymer production rate was 26 kg/h. The production split was thus 49/51. No 1-hexene was introduced into the gas phase reactor.

The polymer collected from the gas phase reactor was stabilised by adding to the powder 400 ppm Irganox B561. The stabilised polymer was then extruded and pelletised under nitrogen atmosphere with a CIM90P extruder, manufactured by Japan Steel Works. The melt temperature was 200° C., throughput 280 kg/h and the specific energy input (SEI) was 200 kWh/t.

The production split between the loop and gas phase reactors was thus 49/51. The polymer pellets had a melt index MFR$_2$ of 10 g/10 min, a density of 916 kg/m$^3$, a 1-butene content of 8.1% by weight, a weight average molecular weight M$_w$ of 67800 g/mol, a number average molecular weight M$_n$ of 19600 g/mol and a z-average molecular weight M$_z$ of 140000 g/mol. Further, the polymer had a zero shear rate viscosity $\eta_0$ of 800 Pa·s, and a shear thinning index SHI$_{0/100}$ of 2.4.

| Polymerisation reactor conditions | | |
|---|---|---|
| Example | 2 | 3 |
| C$_2$ = in loop, mol-% | 7.2 | 6.6 |
| H$_2$/C$_2$ in loop, mol/kmol | 0.63 | 0.63 |
| C$_4$/C$_2$ in loop, mol/kmol | 155 | 183 |
| C$_6$/C$_2$ in loop, mol/kmol | 0 | 0 |
| MFR$_2$ of loop polymer, g/10 min | 120 | 120 |
| Density of loop polymer, kg/m$^3$ | 936 | 936 |
| Production rate in loop, kg/h | 30 | 25 |
| C$_2$ = in gpr, mol-% | 19 | 23 |
| H$_2$/C$_2$ in gpr, mol/kmol | 1.0 | 1.2 |
| C$_4$/C$_2$ in gpr, mol/kmol | * | 48 |
| C$_6$/C$_2$ in gpr, mol/kmol | 12 | 0 |
| Production rate in gpr, kg/h | 30 | 26 |
| Production split, Loop/gpr | 50/50 | 49/51 |

*indicates that the level was too low to be detected by GC

Polymer properties

| Example | 2 | 3 |
|---|---|---|
| $MFR_2$, g/10 min | 20 | 10 |
| Density, kg/m$^3$ | 915 | 915 |
| $M_z$/1000 | 134 | 140 |
| $M_w$/1000 | 59.6 | 67.8 |
| $M_n$/1000 | 16.9 | 19.6 |
| $\eta_0$, Pa·s | 460 | 800 |
| SHI$^{5/100}$ | 2.7 | 2.4 |
| $\eta_1$, Pa·s | 440 | 780 |
| SHI$^{1/100}$ | 2.6 | 2.3 |
| $G'_{5kPa}$, Pa | 810 | 630 |
| $T_m$, °C | 117.3 | 115.8 |
| Crystallinity, % | 36.7 | 36.7 |

Example 4

Tensile Modulus and Impact Properties

The tensile modulus and charpy impact were measured on injection moulded specimens. The results are given in table 3.

TABLE 3

| Property | Standard | Unit | Example 2 | Example 3 |
|---|---|---|---|---|
| Comonomer | | | 1-butene + 1-hexene. | 1-butene |
| Tensile Modulus | ISO 527-2 | MPa | 190 | 165 |
| Charpy Impact; 23° C. | ISO 179 | kJ/m$^2$ | 58 | 55 |
| Density | ISO 1183-D | kg/m$^3$ | 915.5 | 915.8 |

Example 5

Comparative Sample 1

The polymer was manufactured and sold by Borealis under trade name LE8030. This an ethylene butene copolymer formed by Z/N catalysis and has an $MFR_2$ of 28 g/10 min and density of 919 kg/m$^3$.

Comparative Sample 2:

The polymer manufactured and sold by Borealis under trade name MA8200. MA8200 is a LDPE for injection moulding. The polymer has an $MFR_2$ of 7.5 g/10 min, tensile modulus of 140 MPa and density of 920 kg/m$^3$.

Migration and Extraction Data for Compression Moulded Samples 2 mm thick compression moulded sheets of the polymer from example 2 and the comparative samples were prepared according to ISO1872-2 and subjected to migration tests by total immersion in olive oil at 40° C. for 10 days. Hexane extractions were carried out using ASTM D5227. The results are shown in Table 4.

TABLE 4

| Polymer | Ex 2 | LE8030 | MA8200 |
|---|---|---|---|
| Extractibles in hexane (% wt) | 1.1 | 5.3 | 1.4 |
| Migration (mg/dm$^2$) | 0 | 48.8 | 14 |

The invention claimed is:

1. An injection moulded article produced from a bimodal polyethylene composition having a MWD of 2 to 10 and a density of 905 to 930 kg/m$^3$ comprising
   (a) a lower molecular weight polymer which is a binary copolymer of ethylene and 1-butene, and
   (b) a higher molecular weight polymer which is either a binary copolymer of ethylene and 1-hexene, or a terpolymer of ethylene, 1-butene and a $C_6$ to $C_{12}$ alpha-olefin.

2. An injection moulded article produced from a bimodal polyethylene composition having a MWD of 2 to 10 and a density of 905 to 930 kg/m$^3$ comprising
   a) a lower molecular weight homopolymer of ethylene; and
   b) a higher molecular weight terpolymer of ethylene, 1-butene and a $C_5$ to $C_{12}$ alpha-olefin.

3. An article as claimed in claim 1, wherein the ratio of components a) to b) is 60:40 to 40:60 wt %.

4. An article as claimed in claim 1, wherein the bimodal polyethylene composition has a MWD of from 2 to 8.

5. An article as claimed in claim 1, wherein the bimodal polyethylene composition has an impact strength (ISO179 at 23° C.) of at least 40 kJ/m$^2$.

6. An article as claimed in claim 1, wherein the bimodal polyethylene composition has a tensile modulus (ISO527-2) of from 60 to 400 MPa.

7. An article as claimed in claim 1, wherein the bimodal polyethylene composition has a hexane extractable fraction (ASTM D5227) of less than 3 wt %.

8. An article as claimed in claim 1, wherein the bimodal polyethylene composition has a level of migration measured by immersion in olive oil of less than 10 mg/dm$^2$.

9. An article as claimed in claim 1, being medical or food packaging or a closure means.

10. A process for the preparation of an injection moulded article as claimed in claim 1, comprising:
   (I) polymerizing ethylene and butene in a loop reactor in the presence of a metallocene catalyst;
   (II) transferring the resulting polymer with the metallocene catalyst to a gas phase reactor and polymerizing either (a) ethylene and 1-hexene, or (b) ethylene, 1-butene and a $C_6$ to $C_{12}$ alpha olefin, so as to form a bimodal polyethylene composition having a MWD of 2 to 10 and a density of 905 to 930 kg/m$^3$; and
   (III) injection moulding said composition.

11. An article as claimed in claim 1, wherein said polyethylene composition comprises an ethylene/1-butene copolymer fraction and either an ethylene/1-hexene copolymer fraction or an ethylene/1-butene/1-hexene terpolymer fraction.

* * * * *